(12) United States Patent
Roscini et al.

(10) Patent No.: US 10,227,527 B2
(45) Date of Patent: Mar. 12, 2019

(54) NANOEMULSION OPTICAL MATERIALS

(71) Applicant: INDIZEN OPTICAL TECHNOLOGIES OF AMERICA, LLC, Torrance, CA (US)

(72) Inventors: Claudio Roscini, Barcelona (ES); Héctor Torres-Pierna, Barcelona (ES); Daniel Ruiz-Molina, Barcelona (ES)

(73) Assignees: INDIZEN OPTICAL TECHNOLOGIES OF AMERICA, LLC, Torrance, CA (US); FUTURECHROMES S.L., Barcelona (ES); CONSEJO SUPERIOR DE INVESTIGACIONES CIENTIFICAS (CSIC), Madrid (ES); INSTITUT CATALA DE NANOCIENCIA I NANOTECHNOLOGIA (ICN2), Barcelona (ES)

( * ) Notice: Subject to any disclaimer, the term of this patent is extended or adjusted under 35 U.S.C. 154(b) by 428 days.

(21) Appl. No.: 14/968,586

(22) Filed: Dec. 14, 2015

(65) Prior Publication Data
US 2017/0166806 A1    Jun. 15, 2017

(51) Int. Cl.
| | | |
|---|---|---|
| *C09K 9/02* | (2006.01) | |
| *C08K 5/00* | (2006.01) | |
| *C08K 5/357* | (2006.01) | |
| *G02B 1/04* | (2006.01) | |
| *G02B 5/23* | (2006.01) | |

(52) U.S. Cl.
CPC ............ *C09K 9/02* (2013.01); *C08K 5/0041* (2013.01); *C08K 5/357* (2013.01); *G02B 1/04* (2013.01); *G02B 5/23* (2013.01); *C09K 2211/00* (2013.01); *C09K 2211/185* (2013.01); *G02B 1/041* (2013.01); *G02B 1/043* (2013.01)

(58) Field of Classification Search
CPC .......................................................... C09K 9/02
USPC .......................................................... 428/323
See application file for complete search history.

(56) References Cited

U.S. PATENT DOCUMENTS

| | | |
|---|---|---|
| 5,804,653 A | 9/1998 | Weng |
| 7,848,007 B2 | 12/2010 | Paolini, Jr. et al. |
| 2005/0196626 A1 | 9/2005 | Knox et al. |
| 2007/0071684 A1 | 3/2007 | Crutchley et al. |
| 2012/0141531 A1 | 6/2012 | Coulter et al. |
| 2012/0309761 A1* | 12/2012 | Chow .................... B82Y 20/00 514/236.2 |
| 2015/0024126 A1 | 1/2015 | Hernando Campos et al. |

OTHER PUBLICATIONS

World Intellectual Property Organization, International Search Report and Written Opinion for International Application No. PCT/US2016/060644, dated Feb. 1, 2017, 8 total pages.

* cited by examiner

*Primary Examiner* — Doris L Lee
(74) *Attorney, Agent, or Firm* — SoCal IP Law Group LLP; Mark Andrew Goldstein (57) ABSTRACT

There are disclosed nanoemulsion optical materials, methods of making nanoemulsion optical materials and optical articles comprising nanoemulsion optical materials. A nanoemulsion optical material includes a polymer matrix and a plurality of nano-droplets, comprising an optically interactive material, directly dispersed within the polymer matrix.

18 Claims, 10 Drawing Sheets

NANOEMULSION OPTICAL MATERIALS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to optical materials composed of nano-droplets dispersed in a polymeric solid. The nano-droplets may contain a liquid solution of a dye or other optically interactive material.

Description of the Related Art

Photochromic dyes are compounds that reversibly convert between two states or forms having different colors in response to stimulation with electromagnetic radiation. Typically, irradiation with light within a specific wavelength band causes isomerization or conversion from a relatively transparent form to a more colored or absorptive form. Once the irradiation by light is interrupted, the reverse conversion from the colored form to the transparent form may occur spontaneously through a thermal process. Alternately, conversion from the colored form to the transparent form may be induced or accelerated by irradiating at a wavelength different from that used for the conversion from the transparent state to the colored state. Photochromic dyes that spontaneously convert from the colored form to the transparent form are termed "T-type photochromes" and photochromic dyes that convert from the colored form to the transparent form in response to radiation are termed "P-type photochromes."

The speed of isomerization between the two forms varies according to the wavelengths used, the temperature, the intrinsic properties of the photochromic dye, and the medium where the molecules of the photochromic dye are dissolved or dispersed. Generally, photo-induced conversions are the fastest. The speed of the spontaneous back isomerization from the colored state to the transparent state of T-type photochromes is slower and depends to a large degree on temperature and the medium in which the photochromic dye is dissolved or dispersed.

Available T-type photochromic dyes include, for example, various spirooxazines, azobenzenes, chromenes, and other photochromic systems able to interconvert back thermally through molecular conformational changes (e.g. dihydroazulene) or other mechanisms (e.g. viologens). For all of these families of photochromic dyes, the conversion between their two states requires a geometric and significant conformational change at the molecular level. These molecular changes are generally fast when the photochromic dye is in a liquid solution, where the molecules have a large degree of movement. On the other hand, the conversion speed, particularly for the spontaneous reverse conversion, is greatly slowed when these photochromic dyes are dispersed directly in a solid environment. This is a significant problem in many applications.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
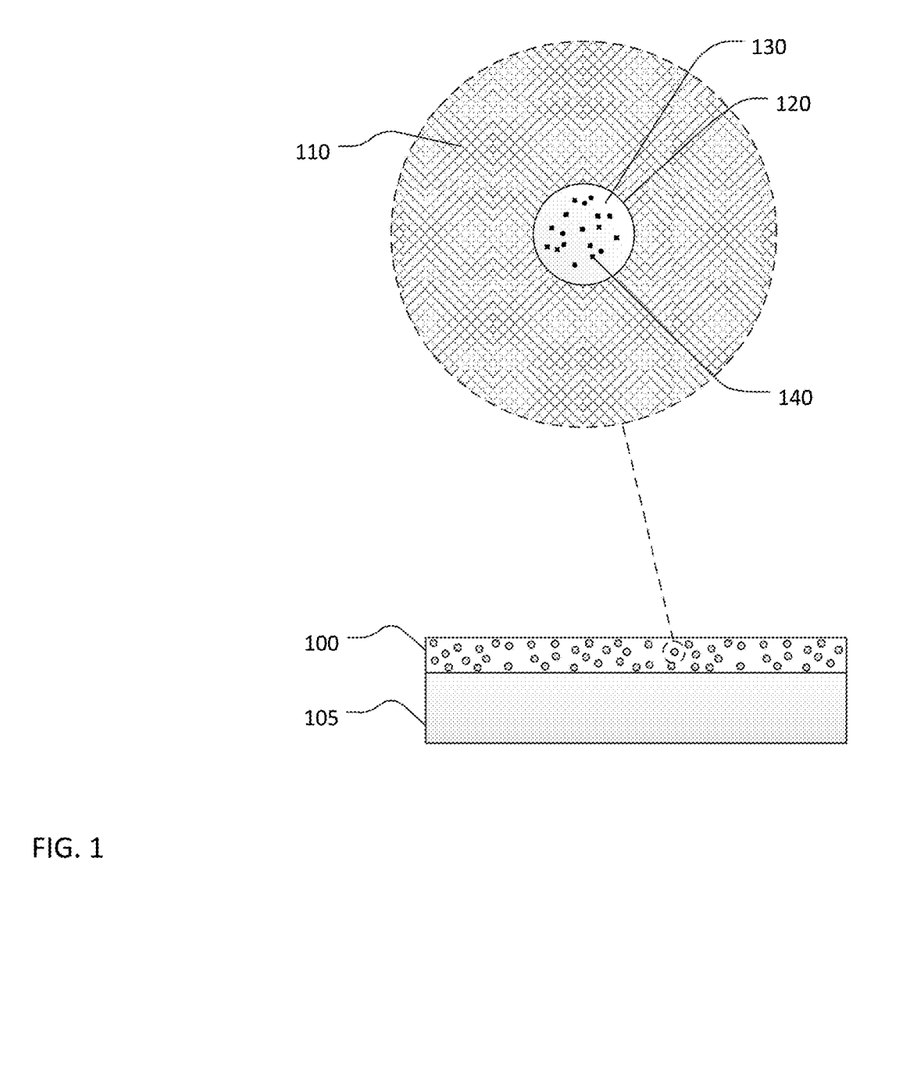
FIG. 1 is a schematic cross-sectional view of a nanoemulsion optical material.

Referring now to FIG. 1, a nano-emulsion optical material 100 may consist of a optically transparent solid polymer matrix 110 in which a large number of liquid nano-droplets 120 are suspended. The term "nano-droplets" means droplets having diameters between 5 and 1000 nm. To allow visible light to be transmitted through the nanoemulsion optical material 100 without scattering, the nano-droplets 120 may preferably have diameters of 200 nanometers or less.

Each of the nano-droplets 120 may be filled with a solution 130 of an optically interactive material (represented schematically by the black squares 140) in a first solvent. In this context, an "optically interactive material" is explicitly defined as a material capable of interacting, in some manner, with incident light. The previously described photochromic dyes are an example of an optically interactive material. Other optically interactive materials that may be contained in the solution 130 include fluorescent dyes, phosphorescent/luminescent dyes, thermochromic dyes, upconverting dyes, and other types of chromic dyes. The optically interactive material within the nano-droplets remains in liquid solution, retaining the properties observed in bulk liquid solutions. In the case of photochromic dyes, the switching rate in the film is maintained as fast as in solution.

The nano-droplets 120 are directly dispersed within the polymer matrix 110. In this application, "directly dispersed"

means dispersed in direct contact with the polymer matrix rather than separated from the polymer matrix by a cortex or capsule of a different material as described in Patent Application No. US 2015/0024126 A1. In this case, the polymer matrix, the solvent in which the optically interactive material is dissolved, and the optically interactive material must be stable in the presence of the other materials. Further the polymer matrix must be insoluble in the solvent.

The nano-emulsion optical material 100 may be applied as a coating on an object, which may be a flat substrate 105 as shown in FIG. 1, a flexible film, a planar or curved surface of an optical element, or an object of some other shape. The nano-emulsion optical material 100 may be formed into a continuous film which subsequently may be applied to or incorporated within, for example, architectural glass, plastics films, automotive window glass, ophthalmic lenses, or other elements where photochromic properties may be desired. Nano-emulsion optical film may be applied to, or incorporated within, such products using processes similar to the processes currently used to incorporate polarizing films. The nano-emulsion optical material 100 may be cast into billets or slabs to be subsequently formed into other shapes by machining or other processes.

Figure 2:
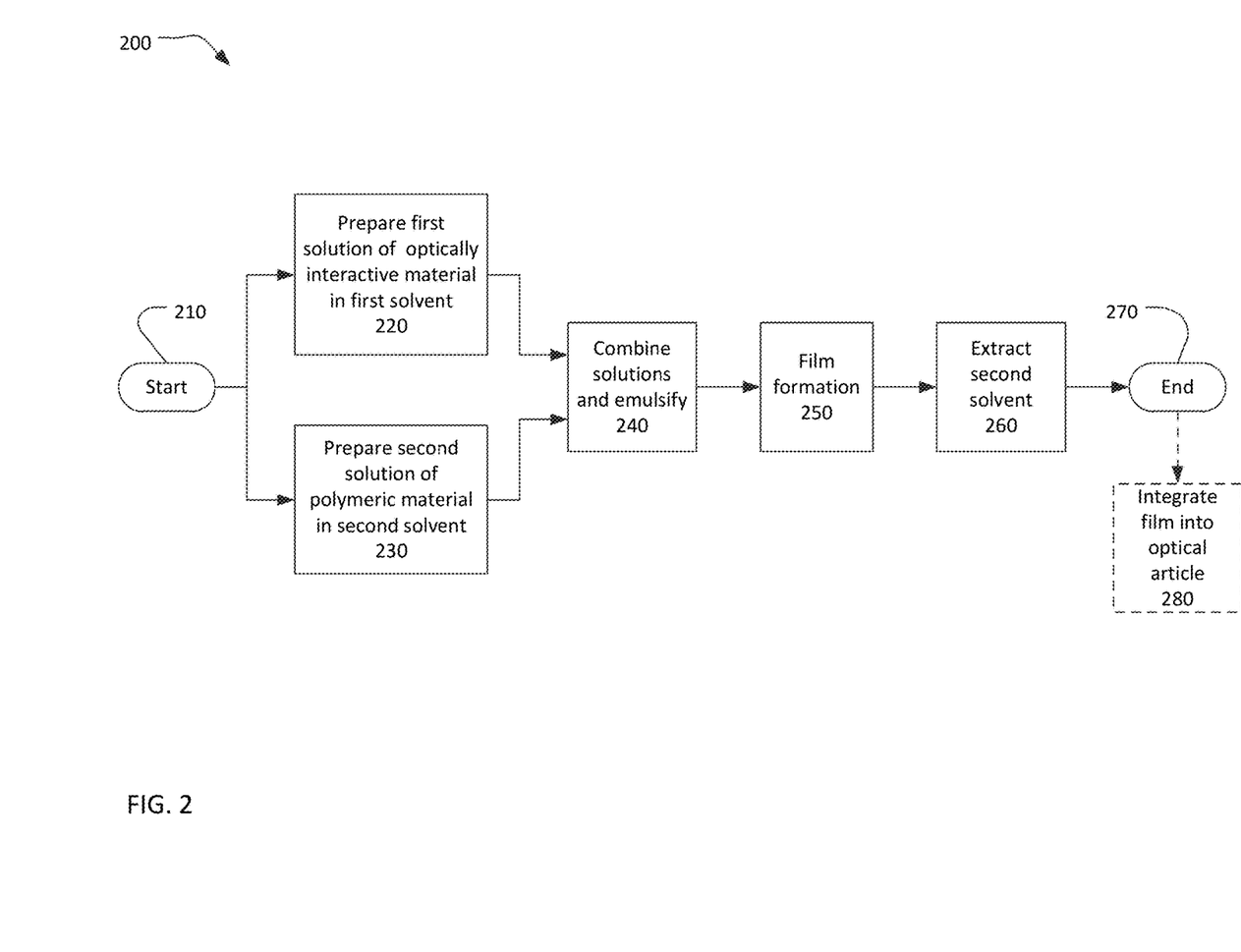
FIG. 2 is a flow chart of a process for producing a nanoemulsion optical material.

Referring now to FIG. 2, a process 200 for producing a nanoemulsion optical material starts at 210 and ends at 270. At 220, a first solution of a selected optically interactive material, or a combination of optically interactive materials, in a first solvent may be prepared. The first solvent may itself be an optically interactive material such as a liquid crystal material, in which case the step of preparing the first solution at 220 may not be required. At 230, a second solution of a selected polymeric material in a second solvent may be prepared. The actions at 220 and 230 may be performed concurrently or consecutively in either order.

The first solvent may be a liquid that (a) is a solvent for the selected optically interactive material or materials, (b) is not a solvent for, or reactive with, the selected polymeric material, and (c) is completely or partially immiscible with the second solvent. The second solvent may be a liquid that (a) is a solvent for the selected polymeric material, (b) is not a solvent for, or reactive with, the selected optically interactive material, and (c) is immiscible with the first solvent. The polymeric material may be one or more polymers or other polymeric material that (a) forms a transparent solid upon extraction of the second solvent, (b) is not reactive with the selected optically interactive material, and (c) is not soluble in the first solvent.

Either or both of the first solution and the second solution may optionally contain a surfactant to inhibit coalescence or agglomeration of the droplets in the nanoemulsion.

Figure 3A:
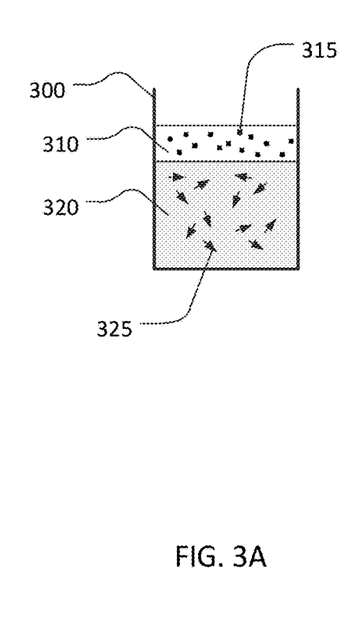
FIG. 3A is a schematic cross-sectional representation of a stage in the process of FIG. 2.
Figure 3B:
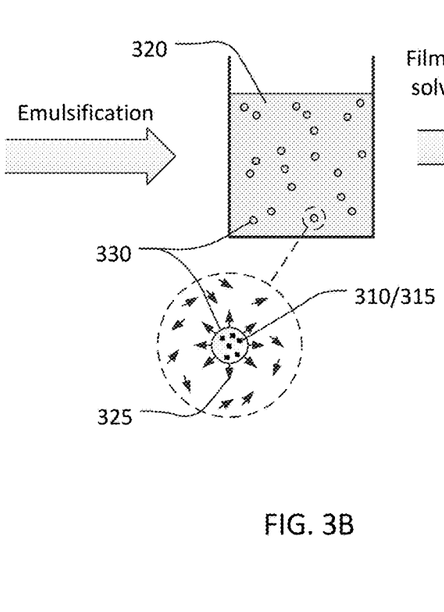
FIG. 3B is a schematic cross-sectional representation of another stage in the process of FIG. 2.

At 240, the two solutions may be combined and emulsified, which is to say agitated to form a preemulsion of droplets of the first solution within a continuous phase of the second solution. The two solutions, prior to emulsification, are shown schematically in FIG. 3A. The first solution 310 containing the optically interactive material 315 (represented by black squares) is immiscible with the second solution 320 containing the polymeric material 325 (represented by arrows). The combined solutions may then be emulsified using, for example, an ultrasonifier, a high pressure homogenizer, a high shear homogenizer, or low energy methods to form a nanoemulsion or a microemulsion. In this context, the term "nanoemulsion" means an emulsion containing droplets with diameters between 5 and 1000 nm. The nanoemulsion is shown schematically in FIG. 3B. The first solution 310 containing the optically interactive material 315 is dispersed as small droplets 330 suspended in the second solution 320 containing the polymeric material 325. Molecules of the polymeric material 325 may attach to the surface of the droplets 330, acting as a surfactant to inhibit the droplets from coalescing or aggregating. The droplets 330 in the nanoemulsion formed at 240 may preferably have diameters of 200 nanometers and more preferably 150 nm or less such that films formed from the nanoemulsion transmit visible light without scattering.

Referring back to FIG. 2, at 250, the nanoemulsion from 240 may be coated onto an object, which may be a flat substrate as shown in FIG. 1 or an object of some other shape. The nanoemulsion may be coated onto the object by casting, spraying, dip coating, spin coating, or some other coating technique. The nanoemulsion may be formed into thin sheets or continuous flexible films using roller coating or another continuous roll-to-roll coating method. Alternatively, at 250, the nanoemulsion may be cast into billets or slabs to be subsequently formed into other shapes by machining or other processes.

Figure 3C:
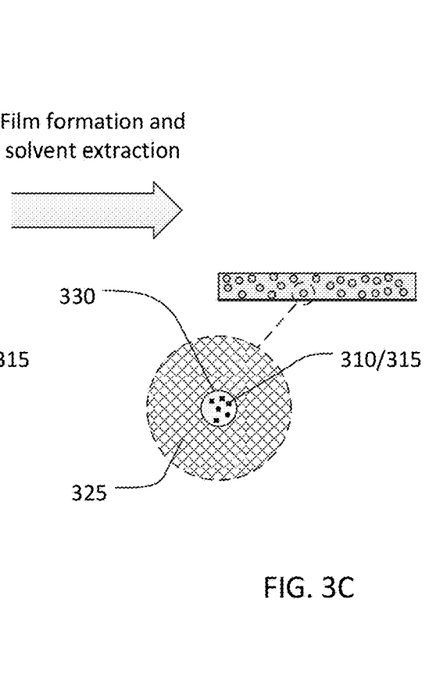
FIG. 3C is a schematic cross-sectional representation of another stage in the process of FIG. 2.

At 260, the second solvent may be evaporated or otherwise extracted from the nanoemulsion. Evaporation may be accelerated using heat and/or vacuum. The nanoemulsion optical material after extraction of the second solvent is shown schematically in FIG. 3C. During extraction of the second solvent, the polymeric material 325 precipitates to form a rigid or flexible transparent matrix in which nano-droplets 330 of the second solution 310 are dispersed. The nano-droplets suspended in the polymeric matrix are not previously encapsulated, which is to say are not enclosed by a capsule wall or cortex of a material other than the polymeric matrix.

At 280, after process 200 is finished, the resulting nano-emulsion optical material may be integrated into an optical article, such as a lens, at 280. The nano-emulsion optical material may be applied or laminated to a surface of an optical element, which may be a flat substrate 105 as shown in FIG. 1, a flexible film, a planar or curved surface of an optical element, or an object of some other shape. The nano-emulsion optical material 100 may be embedded or incorporated within, for example, architectural glass, automotive window glass, ophthalmic lenses, or other elements where photochromic properties may be desired. At 280, nano-emulsion optical film may be applied to, or incorporated within, such products using processes similar to the processes currently used to incorporate polarizing films.

Figure 4:
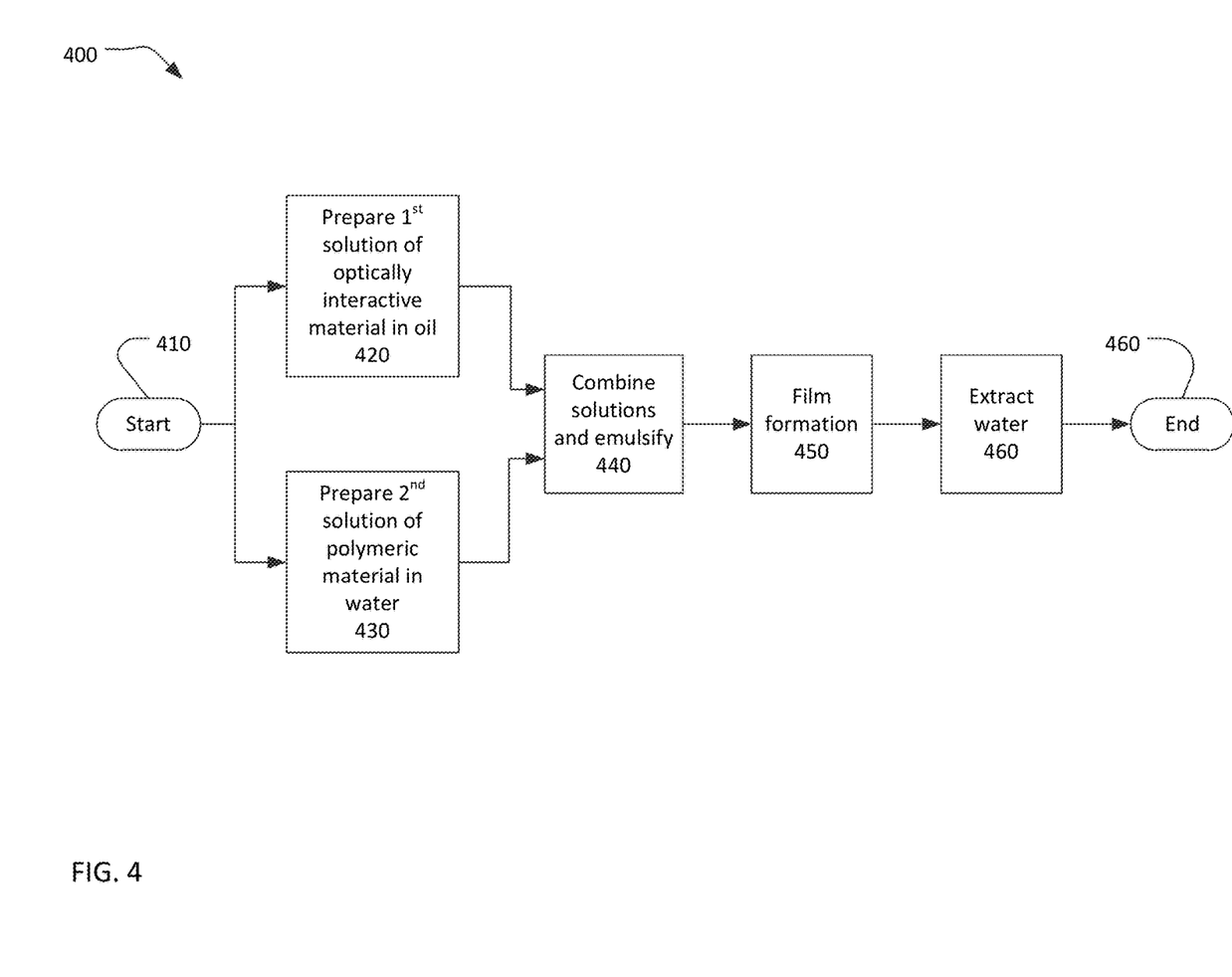
FIG. 4 is a flow chart of a process for producing a nanoemulsion optical material.

FIG. 4 is a flow chart of a process 400 for producing a nanoemulsion optical material using an oil for the first solvent and water for the second solvent. The process 400 starts at 410 and ends at 460. At 420, a first solution may be prepared by dissolving an optically interactive material, or a combination of optically interactive materials, in an oil. In this context, the term "oil" means a neutral chemical substance that is a liquid at ambient temperatures and is immiscible with water. This general definition of "oil" includes classes of chemical compounds that may be otherwise unrelated in structure, properties, and uses. This general definition of "oil" includes classes of chemical compounds, such as liquid crystal materials and phase change materials not typically considered oils. Oils are typically miscible with other oils and the oil used at 420 may be combination of two or more materials. Oils may be animal, vegetable, or mineral/petrochemical in origin. Oils that may be incorporated into the first solution at 420 include alkanes and other mineral oils, silicone oils, vegetable oils such as acid triglycerides, liquid crystal materials, ionic liquids, phase change materials, and other materials with the previously-stated definition of "oil". A material, such as a liquid crystal material, may be both an "oil" and an optically interactive material, in which case an additional optically interactive material may not be required.

The first solution prepared at 420 may include one or more of the previously-described optically interactive materials. Depending on the application and the material, the concentration of the optically interactive material in the first solution may range from 0.1% to 8% by weight. Specific examples that will be described subsequently used several different photochromic dyes in various oils, with dye concentrations in the first solution from 1.2% to 5% by weight.

At 430, a second solution of a film-forming water-soluble polymeric material in water may be prepared. The polymeric material may be, for example, polyvinyl alcohol (PVA), polyvinylpyrrolidone (PVP), cellulose derivatives or other water-soluble polymers. Depending on the application and the polymeric material, the concentration of the polymeric material in the second solution may range from 3% to 40% by weight, and may typically be from 10% to 30% by weight. Specific examples, to be described subsequently, contain several types of PVA having different molecular weights and hydrolysis degree as the polymeric material, with PVA concentrations in the second solution of 10% to 20% by weight.

In the examples to be discussed subsequently, an additional surfactant was not used. Coalescence or aggregation of the nano-droplets was not observed in the nanoemulsion optical films, presumably because the PVA is effective as a stabilizer.

At 440, the two solutions may be combined and emulsified, which is to say ultrasonically emulsified to form a nanoemulsion of droplets of the first solution within a continuous phase of the second solution. The amount of the first solution in the combination may range from 0.02 mL to 1.5 mL of the first solution for each gram of polymeric material in the second solution. The specific examples that will be described subsequently contained from 0.19 mL to 1.43 mL of solution 1 per gram of PVA.

At 450, the nanoemulsion from 440 may be coated onto an object or cast into a film, slab or billet. At 460, most or all of the water may be evaporated or otherwise extracted. Evaporation may be accelerated using heat and/or vacuum. During extraction of the water, the PVA precipitates to form a rigid or flexible transparent matrix in which nano-droplets of the oil (with dissolved dye) are suspended. The nano-droplets suspended in the PVA matrix are not previously encapsulated and are not enclosed by a capsule wall or cortex of a material other than PVA.

The process 400 of FIG. 4 is representative of the process used to fabricate the following examples.

EXAMPLE 1

Solution 1 was prepared by dissolving 4.6 mg of Photorome® I photochromic dye (available from Sigma Aldrich) in 0.4 ml of caprylic/capric triglyceride oil (Miglyol® 812 available from Sasol®). The concentration of dye in solution 1 was 1.2% by weight. Solution 2 was prepared by dissolving 2.1 g of 87%-89% hydrolized polyvinyl alcohol (PVA) with a molecular weight of about 31,000 Daltons (Mowiol® 4-88 PVA available from Sigma Aldrich) in 8.4 g of water. The concentration of PVA in solution 2 was 20% by weight. The two solutions were mixed and subjected to sonication (Ultrasonifier, 70% amplitude, 13 mm tip) for 10 minutes while cooling at 0° C. The resulting suspension was 15.7% PVA, 2.87% oil, and 0.042% dye by weight, with the balance water. The suspension contained 0.19 ml of oil per gram of PVA. 4.5 g of the mixture was cast into a film in a petri dish having a diameter of 9 cm and the water was allowed to evaporate. The resulting nanoemulsion film had a dry weight of 1.08 g and was 15.6% oil and 0.19% dye by weight.

Nanoemulsion films produced in this manner transmit visible light without scattering, indicating the diameters of the nano-droplets suspended within the film are about 200 nm or less. These films have useful photochromic characteristics.

For comparison, solutions of Photorome® I and four polymers commonly used for optical elements were prepared. Each solution contained 1.2 mg Photorome® I and 25 mg polymer for each ml of chloroform solvent. Films were formed by drop casting the solutions onto freshly cleaned glass slides. After evaporation of the solvent at room temperature, the photochromic response of the polymer films was measured.

Figure 5:
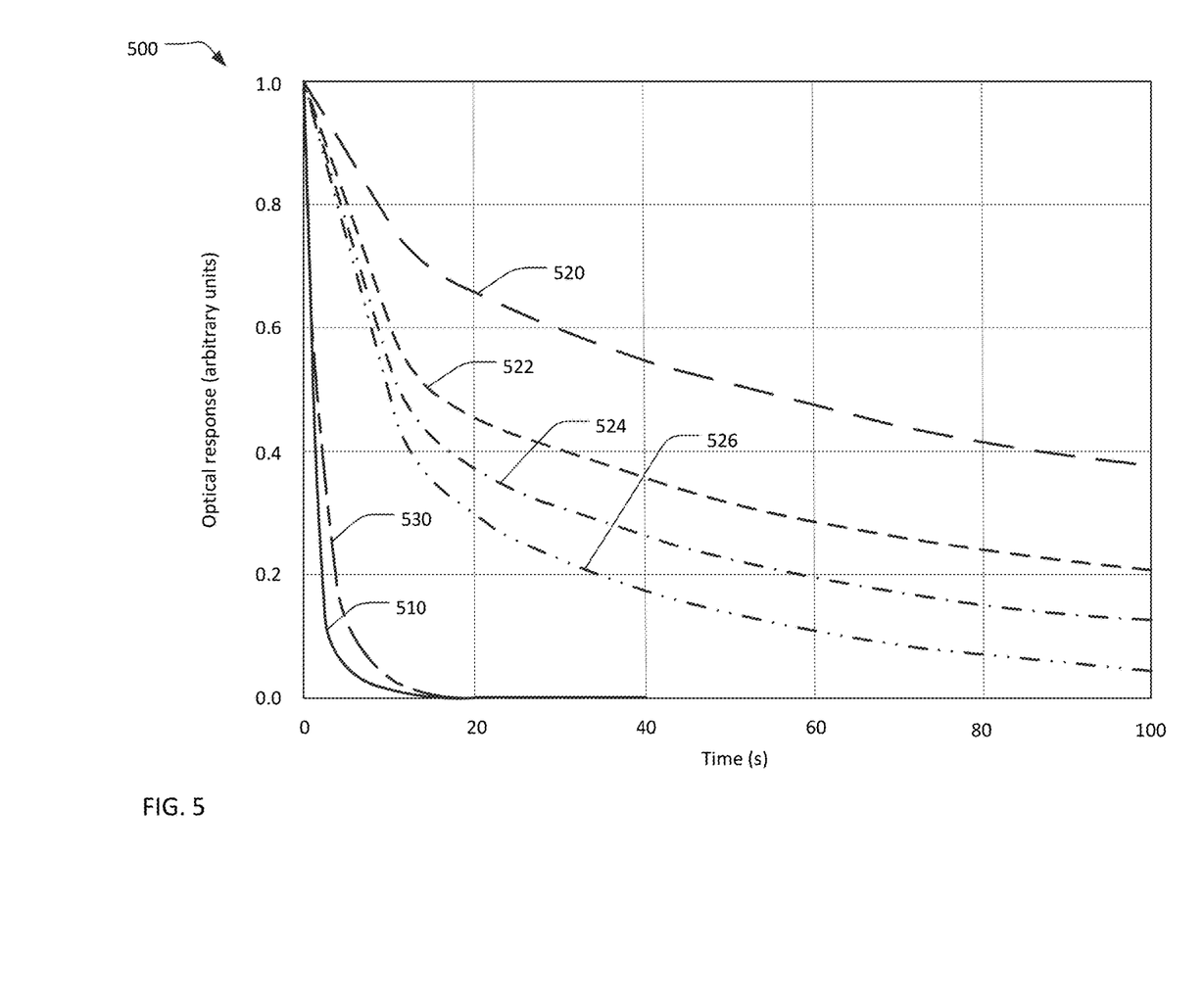
FIG. 5 is a graph showing switching speed for various photochromic optical materials.

FIG. 5 is a graph showing the spontaneous back isomerization from the colored state to the transparent state of the nanoemulsion film (solid curve 510) and solid films made with polyvinyl acetate (curve 520), polycarbonate (curve 522), polystyrene (curve 524) and polymethylmethacrylate (curve 526). The curve 530 shows the spontaneous back isomerization from the colored state to the transparent state of a liquid solution of the Photorome® I photochromic dye in Miglyol® 812. The photochromic kinetics of the nanoemulsion film (curve 510) are similar to the photochromic kinetics of the photochromic dye in liquid solution. This suggests that the photochromic dye remains in solution within the nano-droplets without appreciable diffusion of the dye into the polymeric material. Films produced in this manner are stable at 120° C. for at least six hours and under pressure without apparent diffusion of the oil or dye into the polymeric material.

EXAMPLE 2

Figure 6:
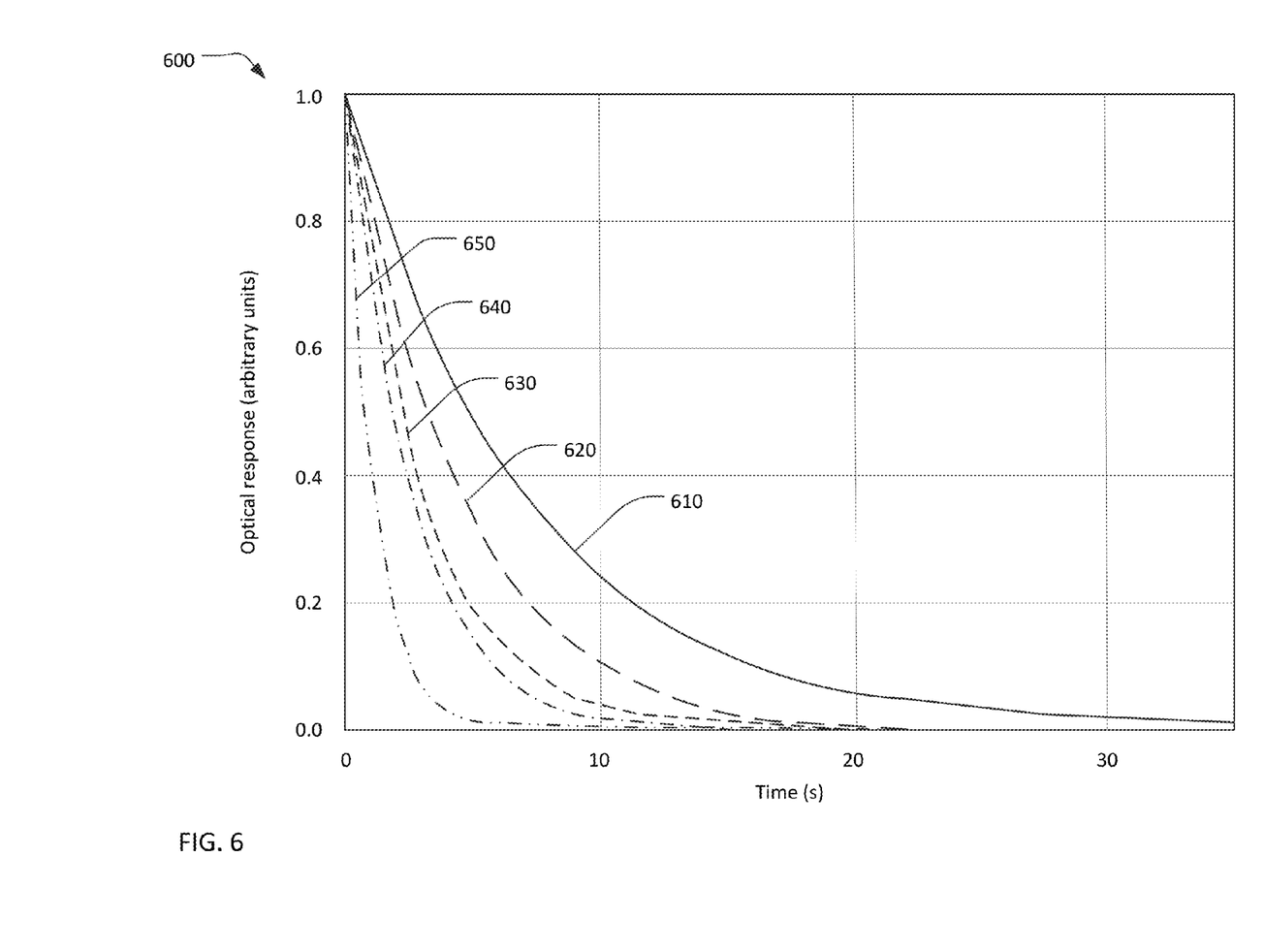
FIG. 6 is another graph showing switching speed for various nanoemulsion optical materials.

The procedure of example 1 was repeated, substituting Reversacol™ Palatinate Purple dye (available from Vivimed Labs) for the Photorome® I dye and substituting an equal volume of the following oils for the Miglyol® 812 oil in solution 1: caprylic/capric/succinic triglyceride oil (Miglyol® 829, available from Sasol®), propylene glycol dicaprylate/dicaprate oil (Miglyol® 840, available from Sasol®) dioctyl terphthalate (DOT), diethyl phthalate (DEP), diisodecyl adipate, polyethylenglycol 2-ethylhexanoate, disehtylhexyl sebacate, polyphenyl-methylsiloxane having a viscosity of 1000 centipoise at room termperature (AP1000 silicone oil available from Sigma Aldrich), and polyphenyl-methylsiloxane having a viscosity of 20 centipoise at room termperature (AR20 silicone oil available from Sigma Aldrich). All of the resulting films exhibited the expected reverse photochromic kinetics. In all cases the spontaneous back isomerization from the colored state to the transparent state is as fast as in solution and faster than the rate of the same photochromic dye in polymeric matrices. FIG. 6 shows a graph 600 of the spontaneous reverse isomerization response of optical materials made with the following oils: DOT (curve 610), Miglyol® 840 (curve 620), Miglyol® 812 (curve 630), Miglyol® 829 (curve 640) and DEP (curve 650).

EXAMPLE 3

Figure 7:
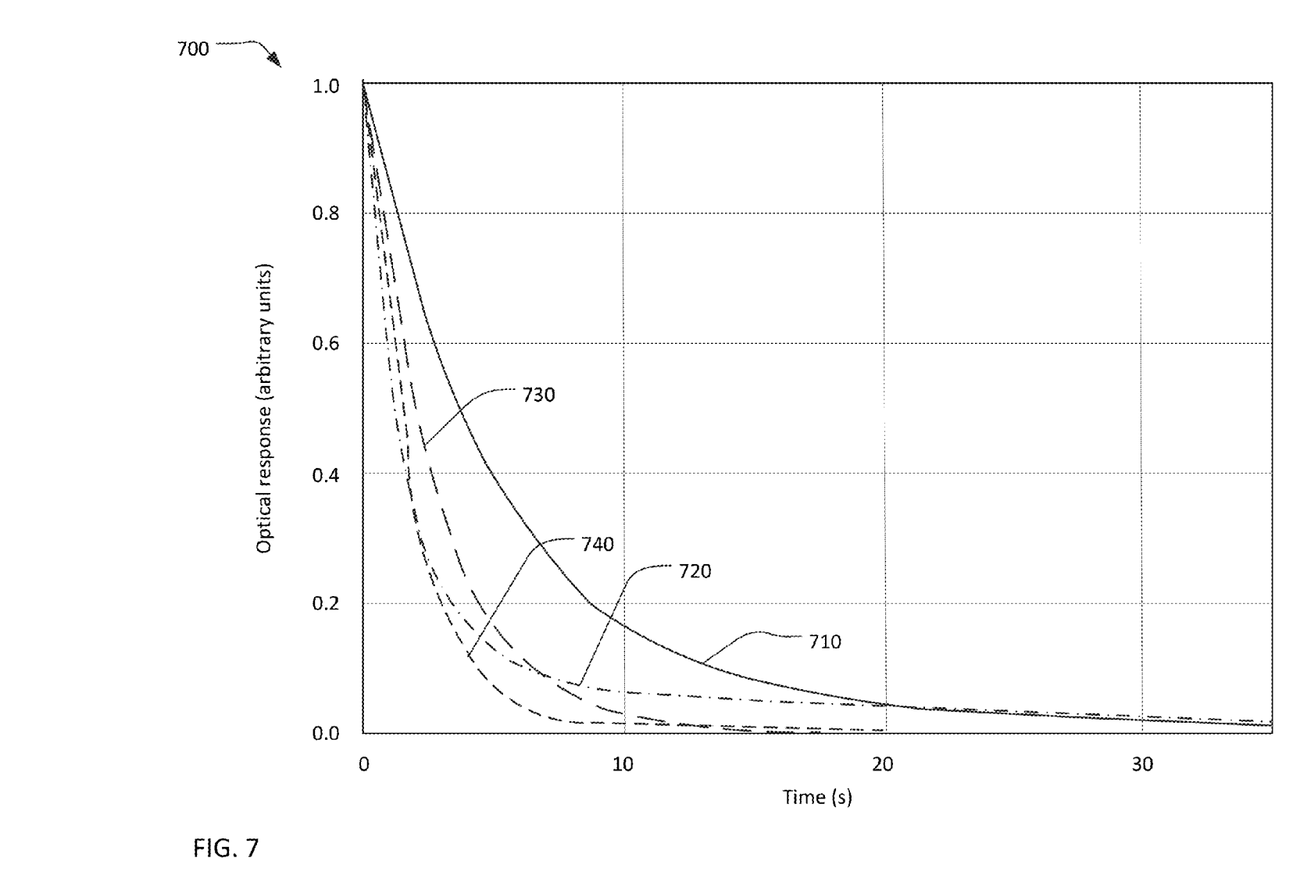
FIG. 7 is another graph showing switching speed for various nanoemulsion optical materials.

The procedure of example 1 was repeated, substituting an equal weight of the following photochromic dyes for the Photorome I dye in solution 1: Reversacol™ Palatinate Purple, Reversacol™ Volcanic Grey, Reversacol™ Berry Red, Reversacol™ Storm Purple, Reversacol™ Claret, Reversacol™ Oxford Blue, Reversacol™ Pennine Green, and Reversacol™ Humber Blue, Reversacol™ Rush Yellow, Reversacol™ Velvet Blue, Reversacol™ Midnight Grey (all available from Vivimed Labs). All of the resulting films exhibited the expected photochromic response. FIG. 7 shows a graph 700 of the spontaneous reverse response of nanoemulsion optical materials containing the following photochromic dyes: Reversacol™ Claret (curve 710), Photorome ® I (curve 720), Reversacol™ Palatinate Purple (curve 730), and either Reversacol™ Oxford Blue or Reversacol™ Storm Purple (curve 740). All films showed the expected fast response comparable to the response times of the same dyes in solution.

EXAMPLE 4

Two samples were prepared using the procedure of example 1, except that Reversacol™ Palatinate Purple dye was substituted for the Photorome® I dye and the amount of dye in solution 1 was increased to 7.6 mg and 19.0 mg. The concentration of dye in the two solutions was 2% and 5% dye by weight, respectively. All of the resulting films exhibited the expected fast photochromic response. The film compositions included 0.31% and 0.77% dye by weight, respectively.

EXAMPLE 5

Solution 1 was prepared by dissolving 9.8 mg of Reversacol™ Palatinate Purple photochromic dye in 0.5 ml of Miglyol® 812 oil. The concentration of dye in solution 1 was 2% by weight. Solution 2 was prepared by dissolving 1.68 g of high molecular weight (88,000-97,000 Daltons) 87%-89% hydrolyzed PVA (H-88 PVA available from Alpha Aesar®) in 13.8 g of water. The concentration of PVA in solution 2 was 11% by weight. The suspension contained 1.5 ml of oil per gram of PVA. The two solutions were mixed and subjected to sonication (Ultrasonifier, 70% amplitude, 13 mm tip) for 10 minutes. The resulting suspension was 9.25% PVA, 2.64% oil, and 0.06% dye by weight with the balance water. 11.1 grams of the mixture was cast into a film in a petri dish (9 cm of diameter) and the water was allowed to evaporate. The resulting film had a dry weight of 1.451 g and was 22.6% oil and 0.45% dye by weight. The film exhibited the expected photochromic response. Similar results were obtained when solution 2 included 8% to 20% by weight of 86-88% hydrolyzed PVA having a molecular weight from 13,000 Daltons to 205,000 Daltons. The fact that the photochromic response kinetics is maintained after changing the PVA molecular weight is a further demonstration that the dye molecules are all dissolved in the nanodroplets and do not diffuse in the PVA matrix.

EXAMPLE 6

Solution 1 was prepared by dissolving 2% (by weight) Reversacol™ Palatinate Purple photochromic dye in Miglyol® 812. Four nanoemulsion optical materials were prepared using the procedure of example 1 except that the volume of solution 1 was increased to 0.5 ml, 1.0 ml, 2.0 ml, and 3.0 ml. The compositions of the corresponding suspensions and dried films are given in Table 1. The four suspensions contained 0.24, 0.48, 0.95, and 1.43 ml of oil per gram of PVA. Note that the balance of the suspension is water and the balance of the dry film is PVA.

TABLE 1

| Oil | Suspension | | | Dry film | |
|---|---|---|---|---|---|
| volume (ml) | PVA % | Oil % | Dye % | Oil % | Dye % |
| 0.5 | 15.5 | 3.5 | 0.09 | 18.9 | 0.38 |
| 1.0 | 14.4 | 6.6 | 0.17 | 31.8 | 0.64 |
| 2.0 | 12.7 | 11.6 | 0.31 | 48.3 | 0.97 |
| 3.0 | 11.4 | 15.6 | 0.43 | 58.3 | 1.17 |

All of the resulting films exhibited the expected fast fading photochromic response.

EXAMPLE 7

Figure 8:
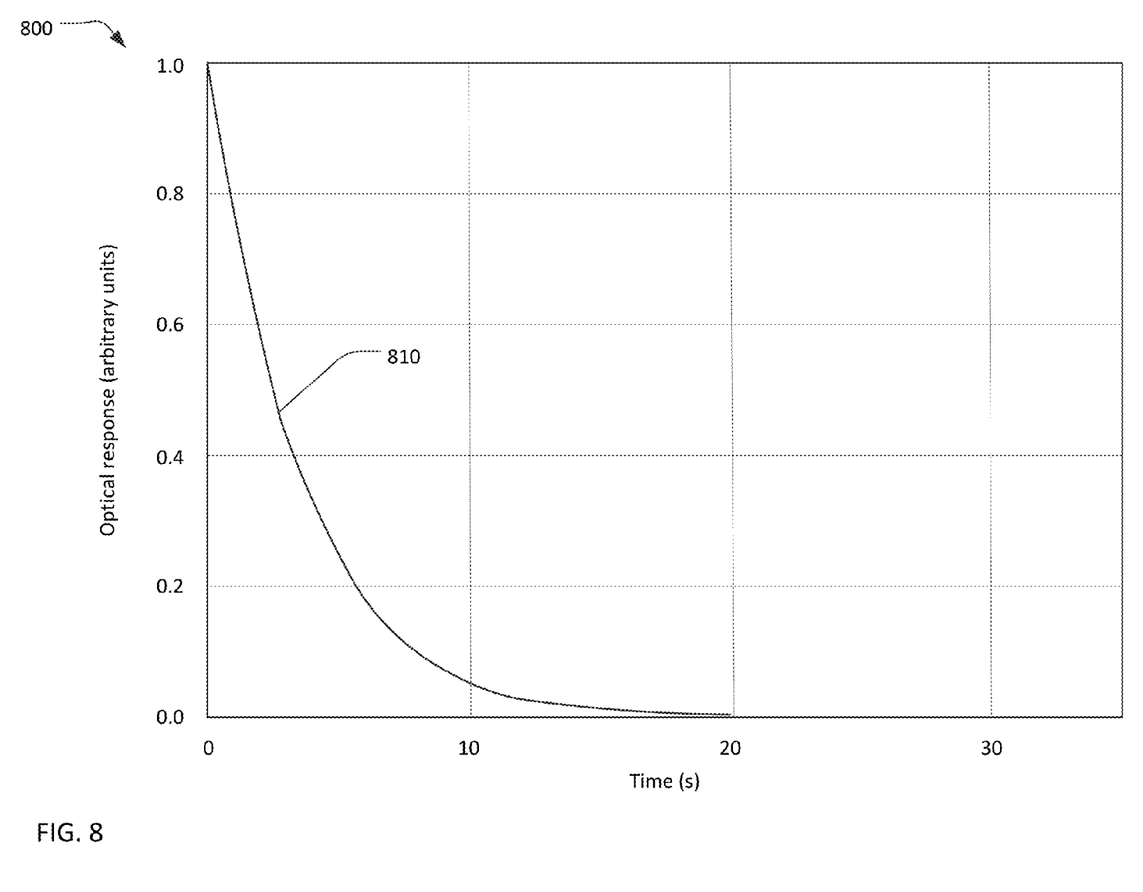
FIG. 8 is a graph showing switching speed for a nanoemulsion optical material.
Figure 9:
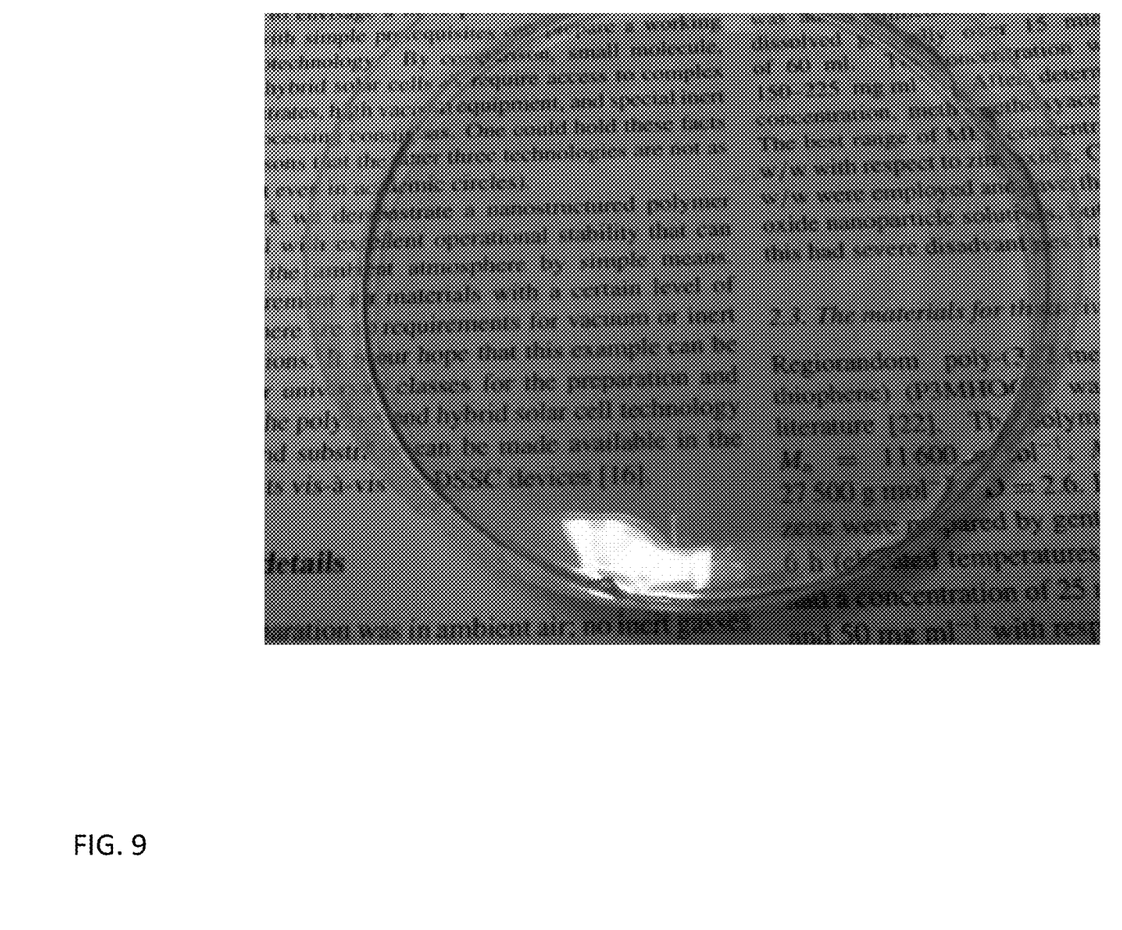
FIG. 9 is a photograph demonstrating the transparency of a film of nanoemulsion optical material.

Solution 1 was prepared by dissolving 200 mg of Reversacol™ Palatinate Purple photochromic dye in 10.2 ml of Miglyol® 812 oil. The concentration of dye in solution 1 was 2% by weight. Solution 2 was prepared by dissolving 42 g of Mowiol® 4-88 PVA in 220 g of water. The concentration of PVA in solution 2 was 20% by weight. The two solutions were mixed and subjected to sonication (Ultrasonifier, 100% amplitude, 25 mm tip) for 40 minutes. 5.0, 10.0 and 20.0 g portions of the mixture were separately cast into films in petri dishes and the water was allowed to evaporate. The resulting films had a dry weight of 1.18 g, 2.36 g, and 4.73 g, respectively and were 19.2% oil and 0.38% dye by weight. The dried films exhibited the expected fast photochromic response. FIG. 8 shows a graph 800 of the spontaneous reverse response (curve 810) of the nanoemulsion optical material of example 7. Although the nanoemulsion after sonication was translucent, rather than transparent, the resulting dried films were highly transparent. FIG. 9 shows a photograph demonstrating that text is clearly visible through a film of the nanoemulsion optical material in its uncolored state.

EXAMPLE 8

Figure 10:
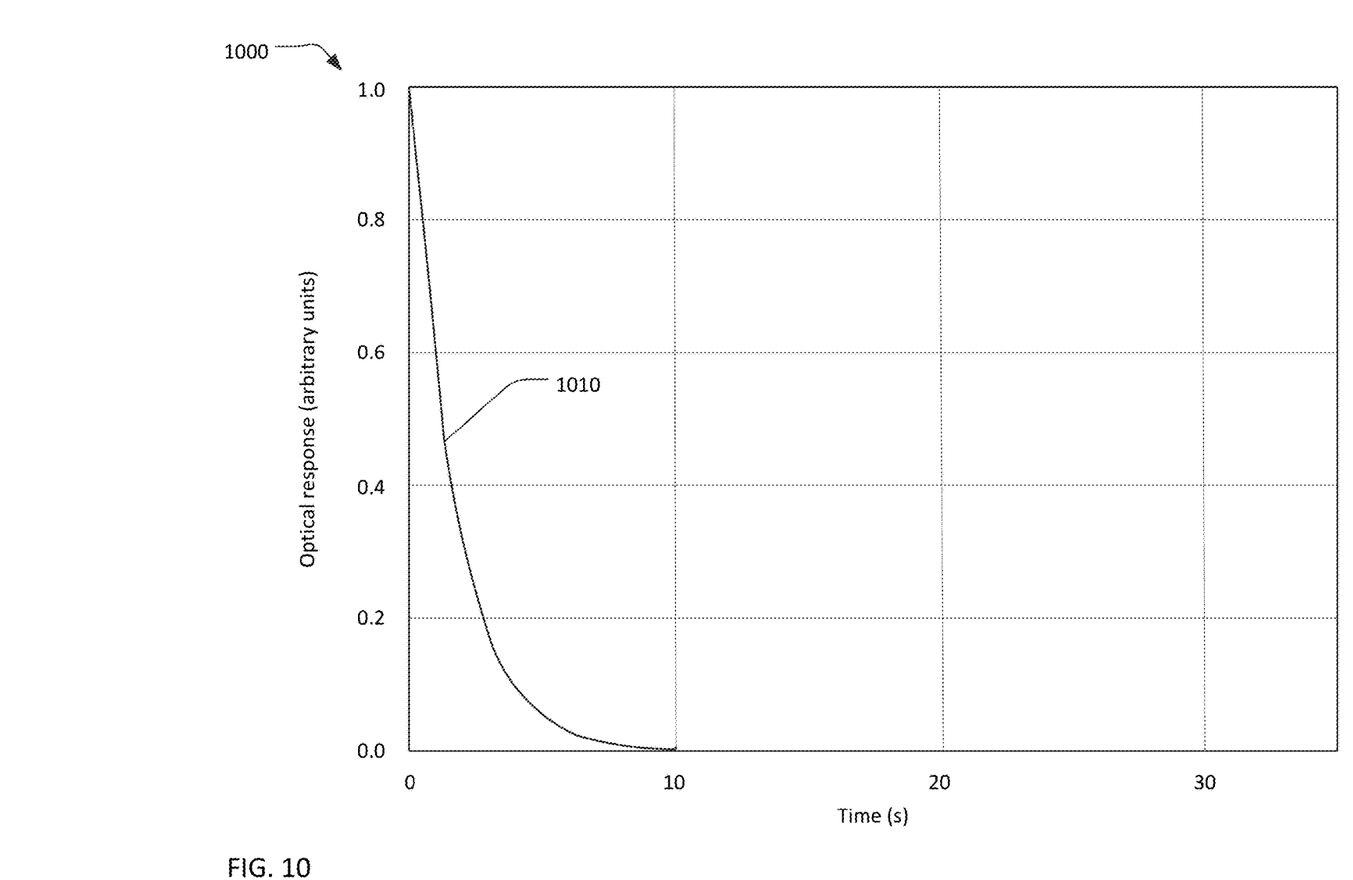
FIG. 10 is a graph showing switching speed for a nanoemulsion optical material.

Solution 1 was prepared by dissolving 1 mg of Reversacol® Palatinate Purple photochromic dye in 0.11 ml of Miglyol® 812 oil. Solution 1 had a concentration of 1% dye by weight. Solution 2 was prepared by dissolving 1.05 g of Mowiol® 10-98 PVA (molecular weight of 61,000 Da, 98-99% hydrolyzed, Sigma Aldrich PVA 10-98) in 10.5 g of water. The concentration of the PVA in solution 2 was 10% by weight. The two solutions were mixed and subjected to 10 minutes of magnetic stirring. Successively, the mixture was emulsified using a high shear homogenizer (IKA, T18 digital Ultraturrax) at 5000 rpm for 10 minutes. The final nanoemulsion was then prepared by subjecting the emulsion to sonication (Branson 400 W-20 kHz digital sonifier, 70% power) for twenty minutes. During sonication, the mixture was maintained at approximately 0° C. The resulting nanoemulsion was partially translucent with a slight bluish opalescence. The nanoemulsion was cast into a Petri plate of 9 cm of diameter and the water is allowed to dry at room temperature for approximately 24 hours. The resulting film possessed good transparency properties and liquid-like fast fading photochromic behavior. FIG. 10 shows a graph 1000 of the spontaneous reverse response (curve 1010) of the nanoemulsion optical material of example 8.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A nanoemulsion optical material comprising:
a polymer matrix; and
a plurality of unencapsulated nano-droplets, comprising an optically interactive material, directly dispersed within the polymer matrix, wherein the polymer matrix comprises polyvinyl alcohol (PVA).

2. The nanoemulsion optical material of claim 1, wherein the PVA is 87% to 99% hydrolyzed.

3. The nanoemulsion optical material of claim 1, wherein the PVA has a molecular weight from 10,000 to 250,000 Daltons.

4. The nanoemulsion optical material of claim 1, wherein the plurality of unencapsulated nano-droplets comprise an oil in which the optically interactive material is dissolved.

5. The nanoemulsion optical material of claim 4, wherein an amount of oil in the nanoemulsion optical material is 15% to 60% by weight.

6. The nanoemulsion optical material of claim 4, wherein the optically interactive material comprises a dye selected from the group consisting of photochromic dyes, fluorescent dyes, phosphorescent dyes, luminescent dyes, thermochromic dyes, and upconverting dyes.

7. The nanoemulsion optical material of claim 4, wherein the optically interactive material is a photochromic dye.

8. The nanoemulsion optical material of claim 7, wherein the optically interactive material is a T-type photochromic dye.

9. The nanoemulsion optical material of claim 7, wherein an amount of photochromic dye in the nanoemulsion optical material is 0.19% to 1.2% by weight.

10. A nanoemulsion optical material comprising:
a polymer matrix; and
a plurality of unencapsulated nano-droplets, comprising an optically interactive material, directly dispersed within the polymer matrix, wherein the plurality of unencapsulated nano-droplets comprise one or more of a liquid crystal material, an ionic liquid, and a phase change material.

11. The nanoemulsion optical material of claim 10, wherein the polymer matrix comprises polyvinyl alcohol (PVA), and wherein the PVA is 87% to 99% hydrolyzed.

12. The nanoemulsion optical material of claim 10, wherein the polymer matrix comprises polyvinyl alcohol (PVA), and wherein the PVA has a molecular weight from 10,000 to 250,000 Daltons.

13. The nanoemulsion optical material of claim 10, wherein the plurality of unencapsulated nano-droplets comprise an oil in which the optically interactive material is dissolved.

14. The nanoemulsion optical material of claim 13, wherein an amount of oil in the nanoemulsion optical material is 15% to 60% by weight.

15. The nanoemulsion optical material of claim 13, wherein the optically interactive material comprises a dye selected from the group consisting of photochromic dyes, fluorescent dyes, phosphorescent dyes, luminescent dyes, thermochromic dyes, and upconverting dyes.

16. The nanoemulsion optical material of claim 13, wherein the optically interactive material is a photochromic dye.

17. The nanoemulsion optical material of claim 16, wherein the optically interactive material is a T-type photochromic dye.

18. The nanoemulsion optical material of claim 16, wherein an amount of photochromic dye in the nanoemulsion optical material is 0.19% to 1.2% by weight.

* * * * *